United States Patent [19]

Cullis et al.

[11] Patent Number: 4,556,524

[45] Date of Patent: Dec. 3, 1985

[54] METHOD FOR PREPARING DIGITAL STORAGE DEVICE BY LASER APPLICATION

[75] Inventors: Anthony G. Cullis, Worcester; Hugh C. Webber; Nigel G. Chew, both of Malvern, all of England

[73] Assignee: The Secretary of State for Defence in Her Britannic Majesty's Government of the United Kingdom of Great Britain and Northern Ireland, United Kingdom

[21] Appl. No.: 430,382

[22] Filed: Sep. 30, 1982

[30] Foreign Application Priority Data

Nov. 10, 1981 [GB] United Kingdom ................. 8133925

[51] Int. Cl.⁴ .............................................. B05D 3/06
[52] U.S. Cl. ................................ 264/1.2; 219/121 LF; 264/1.4; 264/25; 264/28; 264/104; 427/45.1; 427/53.1
[58] Field of Search ...................... 264/1.2, 25, 1.4, 28, 264/104; 427/53.1, 45; 219/121 LF

[56] References Cited

U.S. PATENT DOCUMENTS

| | | | |
|---|---|---|---|
| 3,615,317 | 10/1971 | Jagodzinski | 264/25 |
| 4,058,699 | 11/1977 | Van Vloten | 264/25 |
| 4,316,074 | 2/1982 | Daly | 219/121 LF |
| 4,359,486 | 11/1982 | Patalong et al. | 427/53.1 |
| 4,377,421 | 3/1983 | Wada et al. | 219/121 LF |
| 4,377,902 | 3/1983 | Shinada et al. | 427/53.1 |
| 4,414,242 | 11/1983 | Nishimura et al. | 219/121 LF |
| 4,439,245 | 3/1984 | Wu | 427/53.1 |

FOREIGN PATENT DOCUMENTS

| | | | |
|---|---|---|---|
| 0048926 | 4/1980 | Japan | 427/53.1 |
| 1410896 | 10/1975 | United Kingdom. | |
| 1520595 | 8/1978 | United Kingdom. | |
| 2044980 | 10/1980 | United Kingdom. | |

OTHER PUBLICATIONS

"Improvement of Crystalline Quality of SOS with Laser Irradiation Techniques", Japanese Journal of Applied Physics, (pp. L249–L252) (4/1981) vol. 20, No. 4.

"Unique Semiconductor Materials and Structures Produced by Lasers and Electron Beams", J. Vac. Sci. Technol., 20(3) Mar. 1980.

"Polysilicon Transistor on Glass by Pulsed-Laser Annealing", J. Appl. Phys., 53(5) May, 1982, pp. 3897–3899.

Primary Examiner—Jeffery Thurlow
Assistant Examiner—Patrick Dailey
Attorney, Agent, or Firm—Cushman, Darby & Cushman

[57] ABSTRACT

A digital storage device comprises a crystalline substrate such as silicon in which pockets of amorphous substrate material represent one of the binary logic states; the absence of amorphous material represents the other logic state. The amorphous material is formed by irradiation with a laser beam. Typically the radiation for silicon is at 347 nanometers, 2.5 nanosecond pulse length. The power density varies with crystalline orientation; for (001) silicon it is typically 0.3 J/cm² and for (111) silicon it is 0.3 to 0.6 J/cm². Erasure of the information is achieved by laser annealing the amorphous material back to its crystalline form.

7 Claims, 3 Drawing Figures

METHOD FOR PREPARING DIGITAL STORAGE DEVICE BY LASER APPLICATION

This invention relates to digital storage device in which the binary ones and zeros are represented by two different states of a material.

One form of storage device uses a disc having a spiral track. Microscopic pits or the absence of pits represent the logic ones or zero state. These pits modulate the reflectance of the track when suitably illuminated. A detector picks up this modulation for processing into a video signal. Such a disc is used for video recording in place of magnetic tape.

Another form of disc storage device is used by computers. The disc is selectively magnetisable along tracks to represent ones and zeros which are read by magnetic reading heads. Magnetic tape is also used in digital computers, to store information.

Other forms of storage devices include the known
RAM-random access memory;
ROM-read only memory;
EPROM-electrically programmable read only memory, etc.,
employing a multiplicity of metal-oxide-silicon capacitors whose state, i.e. charged or uncharged, represent logic states.

Silicon in amorphous form is known to have a different reflectivity to the crystalline form. Attempts have been made to amorphise crystalline silicon using laser radiation. An article by Liu, Yen & Bloembergen in Appl. Phys. Lett. 34(12) June 15, 1979 pp 864/866 describes use of a 30 picosecond pulse at 532 nanometer wavelength. The article suggests that an amorphous ring pattern was obtained. An article by Tsu, Hodgson, Tan, & Baglin in Phys. Rev. Lett. 42(20) May 14, 1979 pp 1356/8 describes irradiation at 265 nm by a 10 nanosecond pulse. Again an amorphous ring is suggested. Neither of these described techniques is suitable for high speed writing of information, both produce a depth and uniformity of allegedly amorphous silicon that is inadequate for reliable information storage.

According to this invention logic ones and zeros states in a digital storage device are represented by amorphous and crystalline or polycrystalline states of a material such as silicon. Amorphous silicon has a different reflectance and absorption to crystalline and polycrystalline silicon. The two different conditions of the silicon are formed by laser irradiation. Crystalline silicon may be amorphised by a short pulse of short wavelength laser radiation. This causes a rapid melting of say a 1,000 Å layer of silicon followed by a very rapid cooling in which the silicon is unable to freeze into its crystalline form. A longer period of heating by laser radiation allows amorphous silicon to recrystallise. Thus information may be written and erased many times along a silicon surface.

According to this invention a digital storage device comprises a crystalline or polycrystalline substrate in which discrete regions are formed into an amorphous state.

The substrate may be silicon and may be self supporting or formed on a supporting base of sapphire, glass, plastics, etc.

The discrete amorphous regions may be along a linear or curved track, or arranged in a matrix formation.

A laser and detector may be arranged above the surface of the device. In this case the laser directs radiation onto the surface and the detector monitors changes in surface reflectance. Alternatively the detector may be below the substrate and detect laser radiation transmitted through the device.

According to this invention a method of storing digital information comprises the steps of selectively irradiating a substrate with laser radiation to form amorphous regions in a crystalline or polycrystalline surface; the laser radiation being of high frequency and short pulse length so that most of the radiation is absorbed in the top ~3,000 Å of the substrate.

The substrate may be silicon with a surface orientation of (111) of (001). The laser radiation may be in the blue to ultra-violet region of the spectrum e.g. at 347 nm from a frequency doubled Q switched ruby laser. For a (111) surface the pulse length may be 10 to 0.1 nanoseconds typically 2.5 nsec with a power density of 0.1 to 0.8 J/cm$^2$ typically 0.3 to 0.6 J/cm$^2$. For a (001) surface the pulse length is the same but the energy density is about 0.1 to 0.3 J/cm$^2$ typically 0.3 J/cm$^2$.

Deeper pockets of amorphous material may be obtained by cooling the substrate e.g. with liquid nitrogen to 77° K. Power density required for this cooled operation should be increased by about 1.5 to 2 times.

Another laser may be a synchronous mode argon ion pumped dye (e.g. stilbene) laser typically mode locked at 50 MHz on a 3×3 μm pocket. Another type of laser is an Excimer laser at 300–400 nm.

Crystalline material other than silicon may be used, for example GaAs, InP and other semiconductors.

The invention will now be described, by way of example only, with reference to the accompanying drawings of which:

Figure 1:
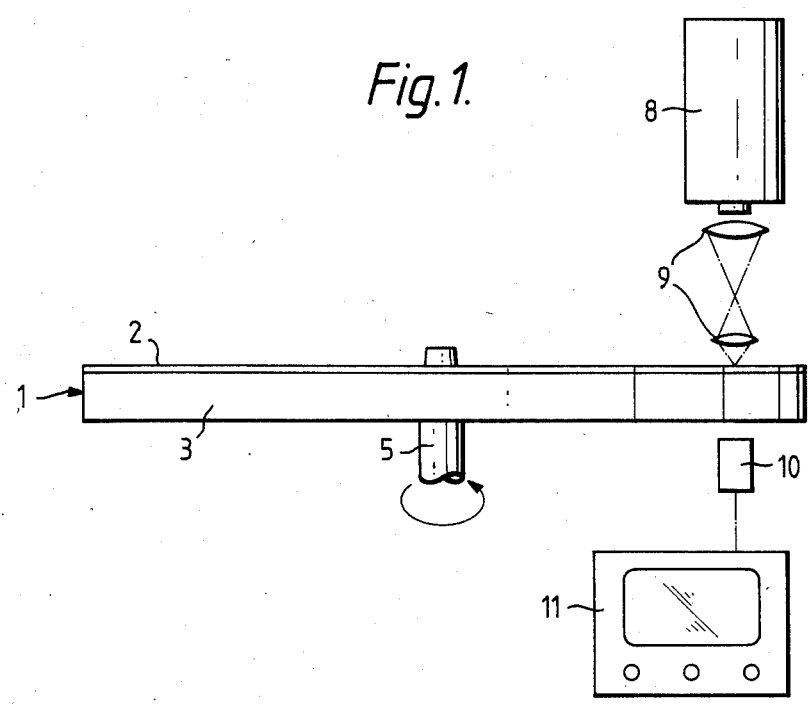
FIG. 1 is a side view of a disc storage device illuminated by a laser and read by transmission through the disc.
Figure 2:
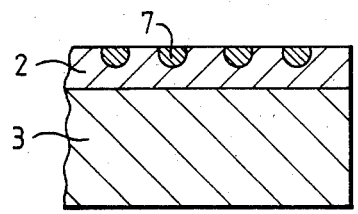
FIG. 2 is an enlarged sectional view of part of the disc of FIG. 1.
Figure 3:
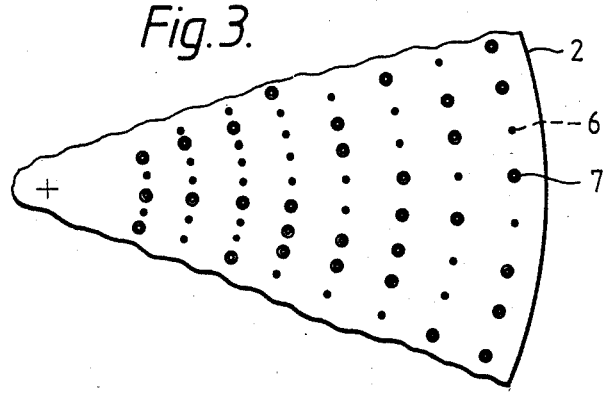
FIG. 3 is a plan view of part of the disc of FIG. 1.

As shown in the drawings a disc storage device 1 comprises a crystalline silicon substrate 2 supported on a sapphire base 3. A central hole locates the disc on a spindle 5. The silicon substrate 2 has a spiral truck 6 along which are formed pockets 7 or regions of amorphous silicon. Each pocket 7 represents a logic state, e.g. logic one, and no pocket represents e.g. logic zero.

A helium neon or similar c.w. laser 8 and lens system 9 illuminates the disc 1 with a 10 μm spot diameter beam of radiation. Beneath the disc 1 and below the laser 8 is a photodetector 10 sensitive to the laser radiation. Output from the detector 10 is to a computer 11 or to a television monitor with digital decoder for use in a known manner.

In operation the disc 1 is rotated and the laser 8 and detector 10 together traversed to follow the spiral track 6. Output from the detector 10 is a string of logic ones and zeros. This is similar to the magnetic disc storage on computers.

The pockets 7 of amorphous silicon are formed as follows. A Q-switched laser output beam is passed through a frequency doubler and focussed onto the substrate, e.g. as shown in FIG. 1 but no detector is needed. A typical frequency is 347 nm. Radiation at this frequency is mostly absorbed in the top 3,000 Å of substrate. A pulse length of around 2.5 nsec. with a power density of around 0.3 J/cm$^2$ is used on (001) silicon substrates. For a (111) silicon substrate the power density can be 0.3 to 0.6 J/cm$^2$. As a result of this irradiation a 1,000 to 2,000 Å thick layer of silicon is heated very rapidly to about 1,500° C. Following extinction of the heating radiation this molten layer cools very rapidly; the rate being so fast that recrystallisation cannot take place across the whole layer thickness. The result is a pocket of amorphous silicon typically 10 μm diameter and 200 to 800 Å deep. The diameter is mostly controlled by the irradiation beam diameter since the sideways diffusion of heat is small e.g. about 1 μm. Thus high storage directly is achievable e.g. 1M bit/cm$^2$ with a pocket size of 100 μm$^2$. The depth of the pockets is partly dependent on the irradiation frequency which is preferably in the blue to ultra-violet region. Ultra-violet is absorbed within about 3,000 Å of the silicon surface. The crystalline orientation also controls the depth of the pocket because the critical cooling rate necessary to give amorphous silicon varies with surface orientation. (111) silicon gives particularly deep amorphous pockets for given irradiation conditions. Additionally, when the silicon is formed on a transparent e.g. glass support, the laser radiation may be directed through the glass onto the silicon. The glass assists in rapid cooling of the heated silicon to give a deep amorphous pocket, e.g. 1,000 Å or more deep. The support may be arranged on both sides of the silicon.

To remove the pocket of amorphous silicon it is heated above about 1,000° C. and the melt is allowed to cool sufficiently slowly to reform in its crystalline state, e.g. solidify in about 0.1 μsec or longer. This may be achieved by a laser radiation of 694 nm frequency, 30 ns pulse length, and 1.5 J/cm$^2$ energy density.

The whole disc may be written and erased as required by the two different laser radiations. To erase large areas a laser beam diffuser may be used to ensure a uniform power density; such a diffuser is described in G.B. patent application No. 2,037,000 A (U.S. Ser. No. 96,299).

Disc storage devices may also be used in a reflective mode. In this case the detector and laser are above the silicon surface. Reflected radiation varies with the state, i.e. crystalline or amorphous, of the substrate.

When operating in this reflective mode the silicon substrate may be much thicker, even self supporting. Also pockets of amorphous silicon can be written on both sides of the disc.

An alternative storage device is in the form of a tape having a silicon surface which is selectively irradiated to an amorphous state.

In both disc and tape devices the silicon may be crystalline i.e. a single crystal, or polycrystalline with crystal size sufficient to give a worthwhile transmission/reflectance difference with amorphous silicon. Polycrystalline silicon may be amorphised as described above and re-annealed to polycrystalline form.

Another form of storage device is used to form a reprogrammable random access memory (R.A.M.). A layer of crystalline (or polycrystalline) silicon has pockets of amorphous silicon formed in a matrix arrangement by pulsed irradiation using a scanning laser beam controlled by a suitable deflection device. In one form the R.A.M. is cooled to liquid nitrogen temperature to enhance the depth of pockets. A second scanning laser beam is caused to be incident on any desired spot in the matrix and is used to read the stored information. The presence or absence of an amorphous pocket indicates a digital one or zero state. The matrix of amorphous silicon pockets may be erased by a further suitable scanning laser beam.

The deflection device may be one or more mirrors or rotating facets that provide a scanning of the matrix. Such scanning systems are known in thermal imaging systems and projection or flying spot displays, e.g. GB No. 425,552 (1934) and European Patent Specification No. 0,014,548 (based on U.S. Ser. No. 9628 filed Feb. 5, 1979).

I claim:

1. A method of making a digital storage device by selectively irradiating a crystalline or polycrystalline silicon substrate with laser radiation to form uniform amorphous regions in the surface of the substrate representing logic one and zero states, the laser radiation being of a wavelength less than 400 nanometers, applied for a time between 0.1 and 10 nanoseconds, with an energy density in the range of 0.1 to 0.8 J/cm$^2$ so that most of the radiation is absorbed in the top approximately 3000 Å of the substrate which rapidly melts and rapidly freezes into an amorphous state.

2. The method of claim 1 wherein the laser radiation is directed through a transparent material forming a support fixed to the substrates.

3. The method of claim 1 wherein the (111) surface of the substrate is irradiated.

4. The method of claim 1 wherein the (001) surface of the substrate is irradiated.

5. The method of claim 1 wherein the substrate is cooled prior to irradiation.

6. The method of claim 1 wherein the substrate is cooled down to 77° K.

7. The method of claim 1 wherein amorphous regions are annealed to crystalline or polycrystalline regions by heating by laser irradiation and a slower cooling.

* * * * *